United States Patent [19]

Oshima

[11] Patent Number: 4,872,642
[45] Date of Patent: Oct. 10, 1989

[54] SEAL MECHANISM FOR BUTTERFLY VALVE WITH PRESS CONTACTING SEAL EFFECTIVE IN BOTH INFLOW AND OUTFLOW DIRECTIONS

[76] Inventor: Akira Oshima, No. 136, Idogayanakamachi, Minami-ku, Yokohama-City, Japan

[21] Appl. No.: 240,831

[22] Filed: Sep. 2, 1988

[30] Foreign Application Priority Data

Jan. 21, 1988 [JP] Japan .................................. 63-12195

[51] Int. Cl.$^4$ ............................................. F16K 25/00
[52] U.S. Cl. .................................. 251/173; 251/174; 251/306
[58] Field of Search ............... 251/157, 174, 176, 305, 251/306, 307, 172, 173, 175

[56] References Cited

U.S. PATENT DOCUMENTS

| | | | |
|---|---|---|---|
| 3,556,475 | 1/1971 | Olenik | 251/306 |
| 3,642,248 | 2/1972 | Benware | 251/176 |
| 4,005,848 | 2/1977 | Eggleston | 251/173 |
| 4,194,749 | 3/1980 | Bonafous | 251/306 |
| 4,258,901 | 3/1981 | Zinnai et al. | 251/174 |
| 4,284,264 | 8/1981 | Hubertson | 251/306 |
| 4,477,057 | 10/1984 | Friess | 251/306 |
| 4,593,916 | 6/1986 | Laulhe et al. | 251/306 |
| 4,638,976 | 1/1987 | Souplet et al. | 251/306 |
| 4,744,572 | 5/1988 | Sahba et al. | 251/176 |
| 4,770,393 | 9/1988 | Hubertson | 251/306 |

FOREIGN PATENT DOCUMENTS 2828238 1/1980 Fed. Rep. of Germany ...... 251/306
2071820 9/1981 United Kingdom ................ 251/173

Primary Examiner—George L. Walton
Attorney, Agent, or Firm—Kane, Dalsimer, Sullivan, Kurucz, Levy, Eisele and Richard

[57] ABSTRACT

A seal mechanism for butterfly valve of concentric opening with press contacting seal, which comprises a ring-formed seal metal arranged surrounding the valve body under insertion in a radially displaceable manner in a circumferential groove formed around the circumference of the valve body, said seal metal having a rounded outer peripheral face; a seal metal disposed surrounding the inner wall of the valve casing and formed integrally therewith, with its seat face inclining relative to the conduit direction of the valve casing; and two tubular buffer rings inserted in said groove of the valve body in between the bottom of the groove and the inner circumference of the seat metal, each of said tubular buffer rings being split along its entire looping length on the upper or lower side of the ring so as to leave a C-shaped cross section to thereby provide a resilient support for said seal metal on said groove bottom at the neutral position on the seat face between the thrust force components in the inflow and the outflow directions of the valve.

3 Claims, 3 Drawing Sheets

SEAL MECHANISM FOR BUTTERFLY VALVE WITH PRESS CONTACTING SEAL EFFECTIVE IN BOTH INFLOW AND OUTFLOW DIRECTIONS

BACKGROUND OF THE INVENTION

1. Field of the Invention

The present invention relates to a seal mechanism for a butterfly valve with press contacting seal means functional against the reaction forces in both inflow and outflow directions, in which the sealing by a press contact between the valve body and the valve seat on the valve casing will be realized at the highest effectiveness upon closure of the valve.

2. Description of the Prior Art

The conventional butterfly valves of this kind have a construction in which the sealing by press contact between the outer periphery of the valve body and the receiving face of the seat metal disposed on the inner wall of the valve casing is effective preferentially in the direction of positive dynamic pressure.

In such a valve structure as above, however, not only the seal effect in the direction of positive dynamic pressure is insufficient but the sealing in the direction of negative dynamic pressure is scarcely reliable. Thus, conventional butterfly valves are apt to suffer from leakage troubles, requiring thus considerable maintenance costs, repair works and times with an additional disadvantage of necessity for concurrent employment of non-return valves and other valve means in the case where a flow loop is formed in the pipe line arranement, resulting in an additional investment cost.

SUMMARY OF THE INVENTION

The object of the present invention is to provide an improved seal mechanism for butterfly valve in which the disadvantages incidental to the conventional butterfly valves have been eliminated and a high sealing performance is attained in both the directions of positive and negative dynamic pressures.

It has now been discovered that the above object can be achieved by a novel seal mechanism for butterfly valve according to the present invention, which comprises a ring-formed seal metal with rounded outer peripheral face arranged surrounding the valve body under insertion in a circumferential groove formed around the circumference of the valve body in a radially displaceable manner; a seat metal for receiving said outer peripheral face of the seal metal for effecting press contacting engagement therewith, disposed around the inside wall of the valve casing and formed integrally therewith with its seat face inclining relative to the conduit direction of the valve casing; and two tubular buffer rings inserted in said groove of the valve body between the bottom of the groove and the inner circumference of the seat metal, each of said tubular buffer rings being split along its entire looping length on the upper or lower side of the ring so as to leave each a C-shaped cross section to thereby provide a self-aligned resilient support of said seal metal on the groove bottom at the neutral position on the seat metal between the thrust force components in the inflow and in the outflow directions of the valve.

DETAILED DESCRIPTION OF PREFERRED EMBODIMENT

The two tubular buffer rings of C-shaped cross section may be disposed in the circumferential groove of the valve body in such a manner that the splits thereof are in opposition outwardly to each other, so as to facilitate settlement of the valve body at a neutral position on the seat face by an action of interference between the thrust force components in the inflow and the outflow directions.

It is possible to install within each of the buffer rings of C-shaped cross section a resilient means made of, for example, a shaped metal etc., of a size corresponding to the size of the butterfly valve and to each specific condition required, in order to supplement the compression strength of the rings.

Below, the present invention is described in detail by way of a specific embodiment with reference to the Drawings appended.

Figure 2:
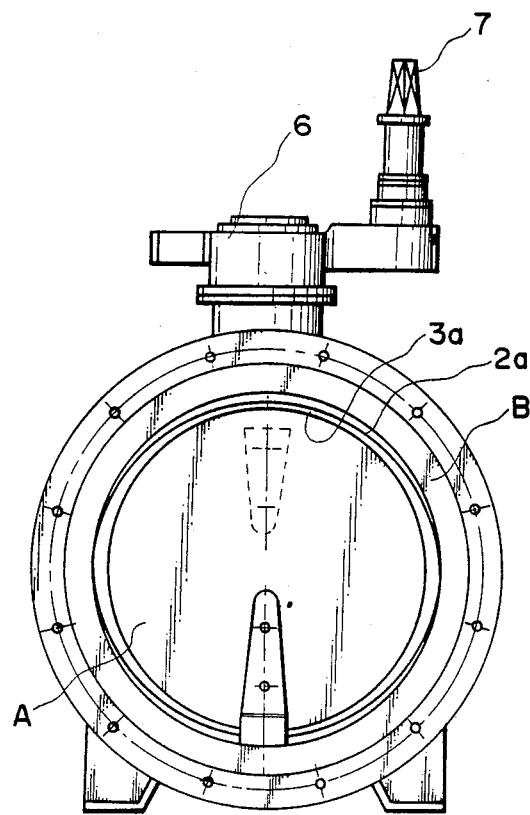
FIG. 2 is a front view of a butterfly valve in which the seal mechanism according to the present invention is incorporated.
Figure 3:
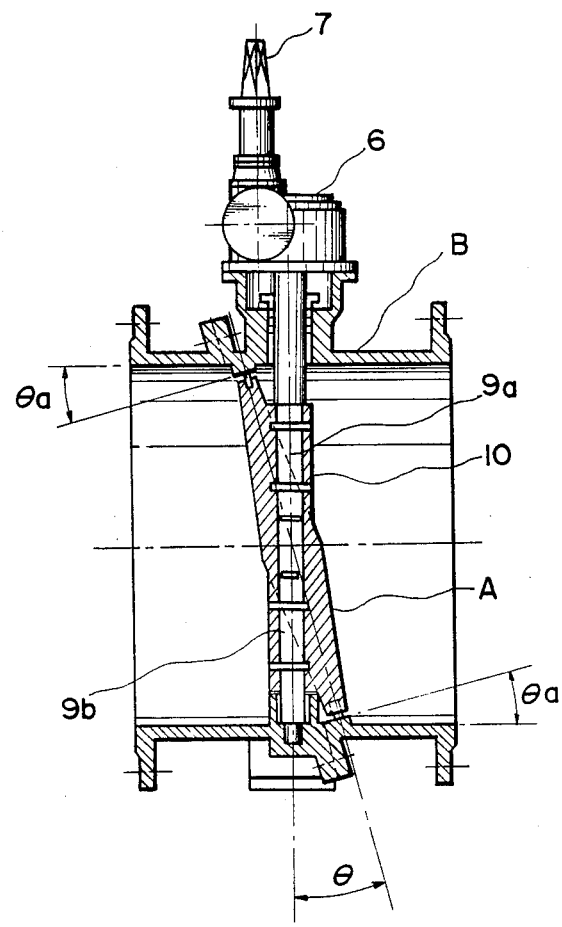
FIG. 3 is a cross sectional side view of the butterfly valve of FIG. 2.

A butterfly valve having the seal mechanism according to the present invention shown in FIGS. 2 and 3 consists of a valve body (A) arranged so as to realize opening and closing of the fluid flow path by rotating around a vertical support shaft and of a valve casing (B) accomodating said valve body. The rotation of the support shaft (9a, 9b) is effected by a valve operating shaft 7 arranged in engagement with a reduction gear 6 as in the conventional butterfly valves. Surrounding the inner wall of the valve casing (B), a seat metal 3 in a form of stripe having a constant lateral width is disposed in a plane inclining to the vertical section of the valve casing by an angle of $\theta a$ ($=\theta$) with its seat face $3a$ for receiving the peripheral edge of the valve body (A) inclining relative to the conduit direction of the valve casing (B) at the same angle of $\theta$ ($=\theta a$) over the entire stripe length.

Figure 1:
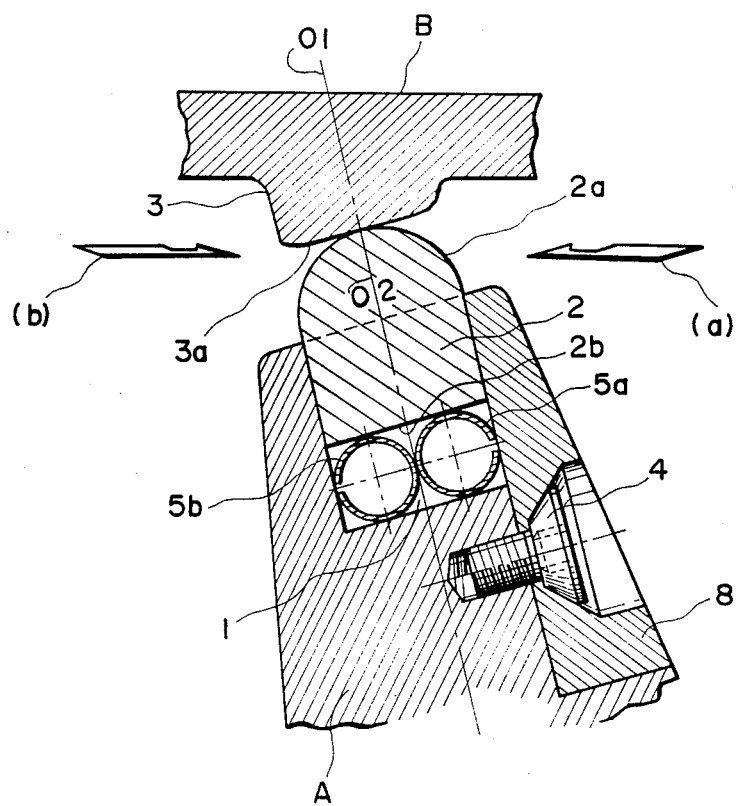
FIG. 1 shows an essential part of one embodiment of the seal mechanism according to the present invention in a cross sectional view.

As shown in FIG. 1 in an enlarged partial sectional view, the valve body (A) has a circumferential groove 1 formed over its entire circumference, in which a ring-formed seal metal 2 having rounded outer peripheral face $2a$ is inserted self-aligned so as to permit a little resilient radial displacement aided by two buffer rings $5a$ and $5b$ disposed parallel in between the bottom of the circumferential groove 1 of the valve body (A) and the inner circumference of the seal metal 2 for supporting it. After insertion of the buffer rings and the ring-formed seal metal in the recess of the circumferential groove 1, a stopper ring 8 is fixed as groove flank on the valve body by screw bolts 4 to form the groove 1. The two C-sectioned buffer rings $5a$ and $5b$ are arranged parallel on the bottom of the circumferential groove 1 preferably in such a manner that each longitudinal split is facing either side wall of the groove 1, namely, the splits are in opposition outwardly to each other so as to cause each split to oppose either positive or negative dynamic pressure, in order to facilitate to settle the valve body at a neutral position on the seat metal by an interference between the thrust force components in the inflow and the outflow directions.

The reason of attainment of high sealing performance in both the inflow and the outflow directions of the valve by the novel seal mechanism according to the present invention may be as follows:

If the dynamic pressure imparted to either one side of the valve body increases, the supporting force by the buffer ring will be increased for the corresponding buffer ring 5a or 5b on this side by the intrusion of the fluid thereinto from the split thereof, resulting in the building up of a balance between the pressure and the supporting force. When the valve body (A) is in the closure position as shown in FIG. 1, the settlement of the seal metal 2 on the seat face of the seat metal 3 at the neutral position, at which the center lines (02 and 01) of the seal metal 2 and of the seat metal 3 coincide with each other, is facilitated spontaneously by a balance between the fluid pressure imposed on the valve body as suggested by the arrow ($\tau$) or ($\square$) and the resilient supporting force imparted by either of the buffer rings 5a or 5b, whereby a reliable sealing is always attained.

As explained above, the novel seal mechanism for butterfly valve according to the present invention offers a highly efficient seal effect by facilitation of sliding settlement of the peripheral edge of seal metal of the valve body at the neutral position on the seat face of the seat metal by a spontaneous balance between the fluid pressure and the supporting force or press force of the buffer rings which is increased by a synergistic effect of the intrinsic elastic reaction force of the tubular buffer ring and the force of swelling thereof due to intrusion of the fluid therein upon surge of the fluid pressure. By incorporating two tubular buffer rings for supporting the seal metal, a complete water-tight seal can be achieved regardless of the positive or negative dynamic fluid pressure.

Thus, a considerable increase in the seal effect of a butterfly valve can be attained by the seal mechanism according to the invention as compared with that of conventional ones.

What is claimed is:

1. A seal mechanism for butterfly valve of concentric opening with press contacting seal, comprising a ring-formed seal metal arranged surrounding the valve body under insertion in a radially displaceable manner in a circumferential groove formed around the circumference of the valve body, said seal metal having a rounded outer peripheral face; a seat metal disposed surrounding the inner wall of the valve casing and formed integrally therewith, with its seat face inclining relative to the conduit direction of the valve casing; and two tubular buffer rings inserted in said groove of the valve body in between the bottom of the groove and the inner circumference of the seat metal, each of said tubular buffer rings being split along its entire looping length on the upper or lower side of the ring so as to leave a C-shaped cross section to thereby provide a resilient radial support force for said seal metal on said groove bottom at the neutral position on the seat face between the thrust force components in the inflow and the outflow directions of the valve whereby, if the thrust force components imparted to either one side of the valve body increases, the supporting force by the buffer ring will be increased for the corresponding buffer ring on said one side by the intrusion of fluid passing through the valve thereinto from the split thereof, resulting in the building up of a balance between the thrust force components and the supporting force for maintaining a seal between said seal metal and said seat metal.

2. A seal mechanism according to claim 1, wherein said two buffer rings of C-shaped cross section are disposed in such a manner that the splits thereof are in opposition outwardly to each other, in order to facilitate to settle the valve body at said neutral position by an interference between the thrust force components in the inflow and the outflow directions.

3. A seal mechanism according to claims 1 and 2, wherein a resilient means is installed, on requirement, within each of the buffer rings of C-shaped cross section in order to supplement the compression strength of the rings.

* * * * *